(12) United States Patent
Wang

(10) Patent No.: US 10,882,699 B1
(45) Date of Patent: Jan. 5, 2021

(54) INTERACTIVE ROTARY MACHINE

(71) Applicant: Tommy Songfong Wang, City of Industry, CA (US)

(72) Inventor: Tommy Songfong Wang, City of Industry, CA (US)

( * ) Notice: Subject to any disclaimer, the term of this patent is extended or adjusted under 35 U.S.C. 154(b) by 0 days.

(21) Appl. No.: 16/550,149

(22) Filed: Aug. 23, 2019

(51) Int. Cl.
*B65G 29/00* (2006.01)
*A47F 5/025* (2006.01)
*E04B 2/72* (2006.01)

(52) U.S. Cl.
CPC .............. *B65G 29/00* (2013.01); *A47F 5/025* (2013.01); *E04B 2/72* (2013.01); *B65G 2812/14* (2013.01)

(58) Field of Classification Search
CPC . A47F 5/02; A47F 5/025; A47F 5/005; B56G 29/00; B56G 2812/14; B65G 29/00; B65G 2812/14
USPC ....................................................... 108/20, 60
See application file for complete search history.

(56) References Cited

U.S. PATENT DOCUMENTS

| | | | | |
|---|---|---|---|---|
| 1,385,281 A * | 7/1921 | Smiley | ............ | A01K 1/126 198/598 |
| 2,075,918 A * | 4/1937 | Waalkes | ............ | B60S 13/02 104/44 |
| 2,331,143 A * | 10/1943 | Senkbeil | ............ | B65G 29/00 198/587 |
| 2,447,072 A * | 8/1948 | Jones | ............ | B65G 29/00 108/22 |
| 2,629,480 A * | 2/1953 | Williams | ............ | B65G 29/02 198/481.1 |
| 2,633,970 A * | 4/1953 | Robinson | ............ | B65B 67/02 198/346 |
| 3,589,499 A * | 6/1971 | Cristy | ............ | B65G 29/02 198/611 |
| 3,836,003 A * | 9/1974 | Vilen | ............ | A47L 15/247 210/241 |
| 4,511,027 A * | 4/1985 | Zamboni | ............ | B67C 7/0006 198/470.1 |
| 4,706,572 A * | 11/1987 | Priesemuth | ............ | B25H 1/02 108/60 |

FOREIGN PATENT DOCUMENTS

GB       968916 A  *  9/1964  ............. B65G 29/00
JP      3195970 U  *  2/2015

* cited by examiner

*Primary Examiner* — Jose V Chen
(74) *Attorney, Agent, or Firm* — Tommy SF Wang; Wang IP Law Group, P.C.

(57) ABSTRACT

The present application discloses an interactive rotary machine, comprising a first conveyor assembly, a first blocker assembly, a second conveyor assembly and a second blocker assembly. The first blocker assembly is coupled to the first conveyor assembly, wherein the first blocker assembly forms a plurality of first sections at the first conveyor assembly. The second blocker assembly is coupled to the second conveyor assembly, wherein the second blocker assembly forms a plurality of second sections at the second conveyor assembly, wherein the first blocker assembly and the second blocker assembly are unblocked when the plurality of first sections and the plurality of second sections are matched. Another interactive rotary machine is also disclosed, comprising a first conveyor assembly, a second conveyor assembly and a blocker assembly.

11 Claims, 15 Drawing Sheets

INTERACTIVE ROTARY MACHINE

TECHNICAL FIELD OF THE INVENTION

The present application generally relates to rotary machine, and more particularly, to an interactive rotary machine.

BACKGROUND OF THE INVENTION

There are many interactive games for party such as gift change. For example, the participants may follow the game rules to select one gift after gathering all gifts from every participants during white elephant. However, the contour of the present is still visible since the gifts are only wrapped but not hidden, making the participation, have different expectation.

In addition, it is less and less entertaining since the traditional gameplay has been played for many years with similar rules. Therefore, a need remains for an interactive rotary machine to provide more interesting and more surprising games for the participants.

SUMMARY OF THE INVENTION

The present application discloses an interactive rotary machine to provide more interesting and more surprising games for the participants.

The interactive rotary machine comprises a first conveyor assembly, a first blocker assembly, a second conveyor assembly and a second blocker assembly. The first blocker assembly is coupled to the first conveyor assembly, wherein the first blocker assembly forms a plurality of first sections at the first conveyor assembly. The second blocker assembly is coupled to the second conveyor assembly, wherein the second blocker assembly forms a plurality of second sections at the second conveyor assembly, wherein the first blocker assembly and the second blocker assembly are unblocked when the plurality of first sections, and the plurality of second sections are matched.

In various exemplary embodiments, the first conveyor assembly comprising a first base, a first conveyor coupled to the first base and a first motor coupled to the first conveyor, wherein the first conveyor is a belt conveyor or a roller conveyor.

In various exemplary embodiments, the second conveyor assembly comprising a second base, a second conveyor coupled to the second base and a second motor coupled to the second conveyor, wherein the second conveyor is a belt conveyor or a roller conveyor.

According to an exemplary embodiment of the interactive rotary machine, the first blocker assembly comprises a plurality of first blockers and the second blocker assembly comprises a plurality of second blockers. Each of the first blocker comprises a fixed portion and a blockable portion, the fixed portion is coupled to the first conveyor assembly and the blockable portion is coupled to the fixed portion. The blockable portion is slidably or rotatably coupled to the fixed portion. In addition, each of the first blocker further comprises a handle coupled to the blockable portion if the blockable portion is rotatably coupled to the fixed portion.

According to the other exemplary embodiment, the interactive rotary machine, the first blocker assembly comprises a plurality of first blockers and the second blocker assembly comprises a plurality of second blockers. Each of the second blocker comprises a fixed portion, and a blockable portion, the fixed portion is coupled to the second conveyor assembly and the blockable portion is coupled to the fixed portion. The blockable portion is slidably or rotatably coupled to the fixed portion. In addition, each of the first blocker further comprises a handle coupled to the blockable portion if the blockable portion is rotatably coupled to the fixed portion.

Another interactive rotary machine is also disclosed, comprising a first conveyor assembly, a second conveyor assembly and a blocker assembly. The first conveyor assembly comprises a first base, a first conveyor coupled to the first base and a first motor coupled to the first conveyor. The second conveyor assembly comprises a second base, a second conveyor coupled to the second base and a second motor coupled to the second conveyor. The blocker assembly is coupled to the first conveyor assembly and the second conveyor assembly to form a plurality of sections, wherein the blocker assembly is blocked when the first conveyor and the second conveyor are moving, wherein the blocker assembly is unblocked when the first conveyor and the second conveyor are stopped.

In various exemplary embodiments, the blocker assembly comprises a fixed portion and a blockable portion, the fixed portion is coupled to the first conveyor assembly and the second conveyor assembly, the blockable portion is coupled to the fixed portion. The blockable portion is slidably or rotatable coupled to the fixed portion.

In various exemplary embodiments, the first conveyor is a belt conveyor.

In, various exemplary embodiments, the second conveyor is a belt conveyor.

Based on the above, the interactive rotary machine of the present application allows the participants to have more surprising game since the blocker assembly may cover the contour of the presents. In addition, since the conveyor may move toward different direction, the diversity of the game may be increased.

Furthermore, the participants may also create different rules for the interactive rotary machine of the present application such as VIP section or no-gift section etc, providing more fun games to the participants.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF DISCLOSED EMBODIMENTS

Figure 1A:
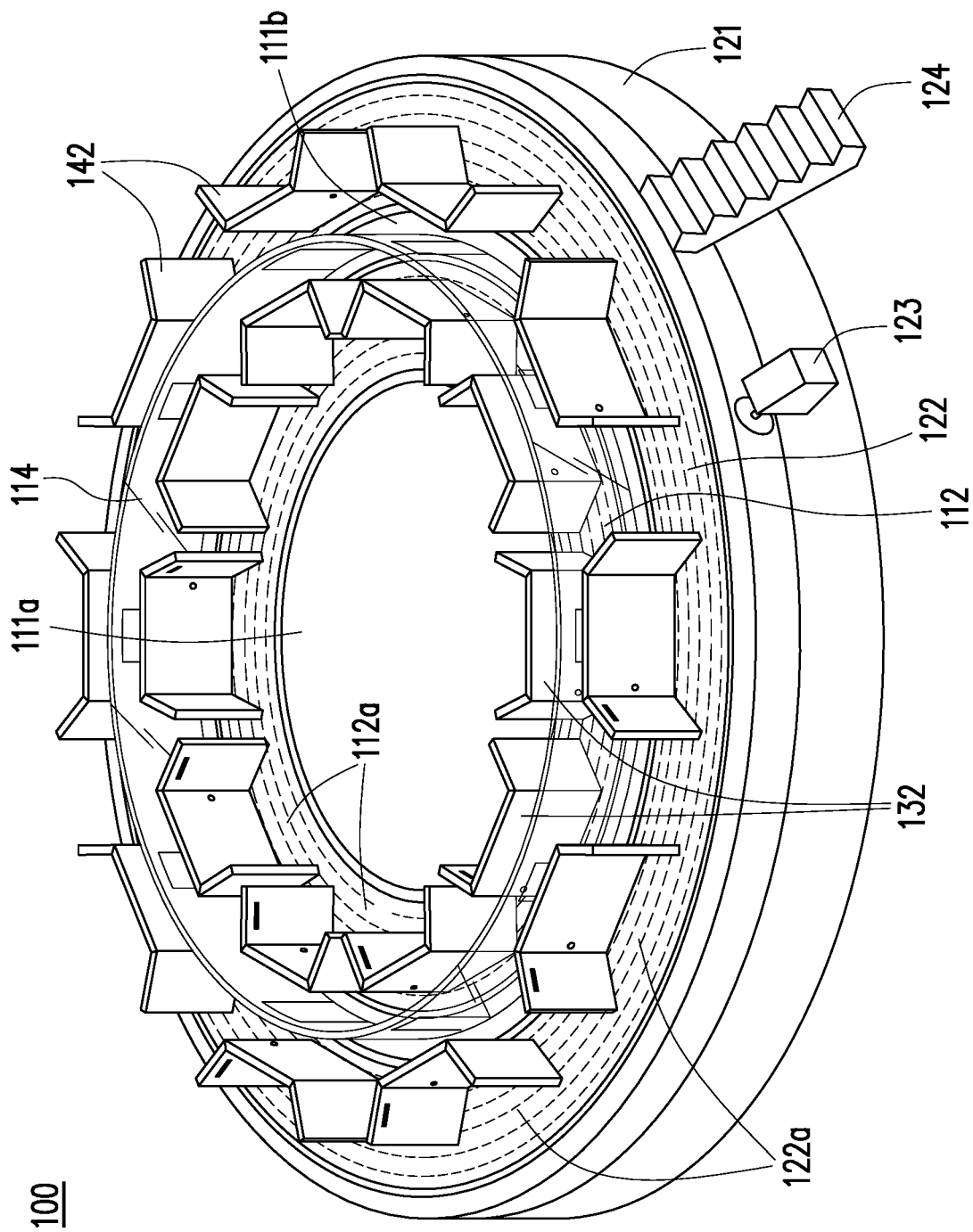
FIGS. 1A-1B are perspective views of an interactive rotary machine of the present application.

Reference will now be made in detail to the present representative embodiments of the present application, examples of which are illustrated in the accompanying drawings. Wherever possible, the same reference numbers are used in the drawings and the description to refer to the same or like parts.

Figure 1B:
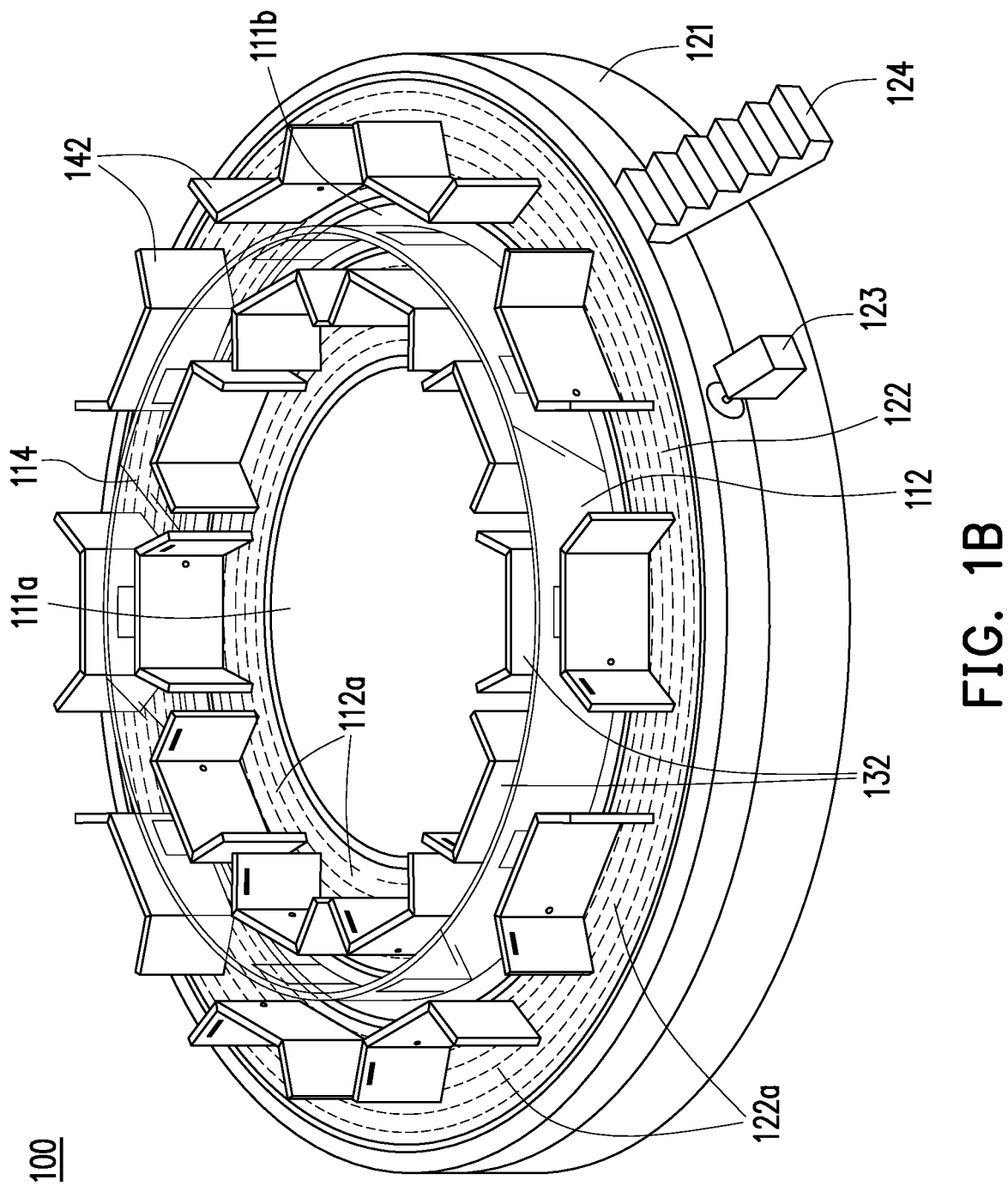
Figure 2:
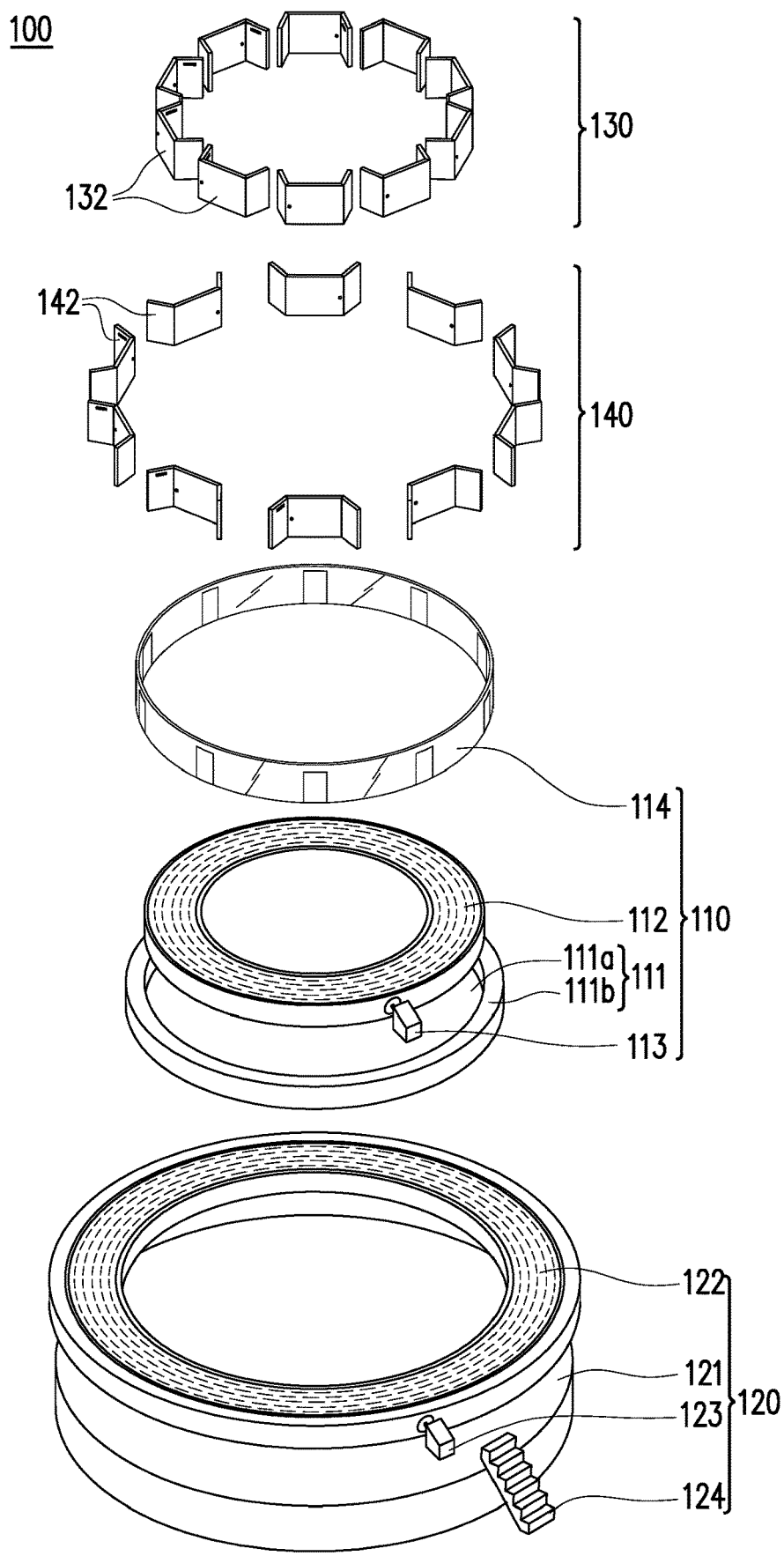
FIG. 2 is an explosive view of the interactive rotary machine.

FIGS. 1A-1B are perspective views of an interactive rotary machine 100 of the present application. FIG. 2 is an explosive view of the interactive rotary machine 100.

Referring to FIGS. 1A-2, the interactive rotary machine 100 comprises a first conveyor assembly 110, a second conveyor assembly 120, a first blocker assembly 130 and a second blocker assembly 140.

The first conveyor assembly 110 comprises a first base 111, a first conveyor 112, a first motor 113 and a mirror 114. The first base 111 comprises an inner base 111a and an outer base 111b. A height of the outer base 111b is larger than a height the inner base 111a. The first conveyor 112 is coupled to the first base 111. Specifically, the first conveyor 112 is located on the inner base 111a and is surrounded by the outer base 111b. The first conveyor 112 of the interactive rotary machine 100 is a belt conveyor as an example. However, the present application is not limited thereto, the first conveyor 112 may be another kind of conveyor such as roller conveyor, sidewall conveyor, rib conveyor etc. The first motor 113 is coupled to the first conveyor 112 to operate the first conveyor 112.

The mirror 114 is coupled to the outer base 111b of the first base 111. The mirror 114 is a double-sided mirror, meaning that people stands at the first side can see, what happened at the second side but people stands at the second side cannot see things at the first side. As shown in FIG. 1A, if the participants stand at the second sections 122a, they may see what happened at the first sections 112a. However, if the participants stand at the first section 112a, they cannot see anything at the second sections 122a. Similarly, as shown in FIG. 1B, if the participants stand at the second sections 122a, they cannot see anything at the first sections 112a. However, if the participants stand at the first section 112a, they can see what happened at the second sections 122a. In addition, the mirror 114 comprises a plurality of doors, allowing the participants to pass through. The mirror 114 in, the interactive rotary machine 100 of the present application is optional, meaning that the mirror 114 is not necessary as part of the game.

The second conveyor assembly 120 comprises a second base 121, a second conveyor 122, second motor 123 and a stair 124.

The second base 121 supports the second conveyor 122. The second conveyor 122 is coupled to the second, base 121. The second conveyor 122 of the interactive rotary machine 100 is a belt conveyor as an example. However, the present application is not limited thereto, the second conveyor 122 may be another kind of conveyor such as roller conveyor, sidewall conveyor, rib conveyor etc. The second motor 123 is coupled to the second conveyor 122 to operate the first conveyor 122. The stair 124 is coupled to the second base 121. The stair 124 of the interactive rotary machine 100 can be replaced by a ramp or a ladder etc. The present application is not limited thereto as long as the participants can move onto the second base 121.

The first blocker assembly 130 is coupled to the first conveyor assembly 110 and comprises a plurality of first blockers 132. The first blockers 132 form a plurality of first sections 112a at the first conveyor assembly 110, and more specifically, at the first conveyor 112 as shown in FIGS. 1A-1B.

The second blocker assembly 140 is coupled to the second conveyor assembly 120 and comprises a plurality of second blockers 142. The second blockers 142 form a plurality of second sections 122a at the second conveyor assembly 120, and more specifically, at the second conveyor 122 as shown in FIGS. 1A-1B.

Figure 3A:
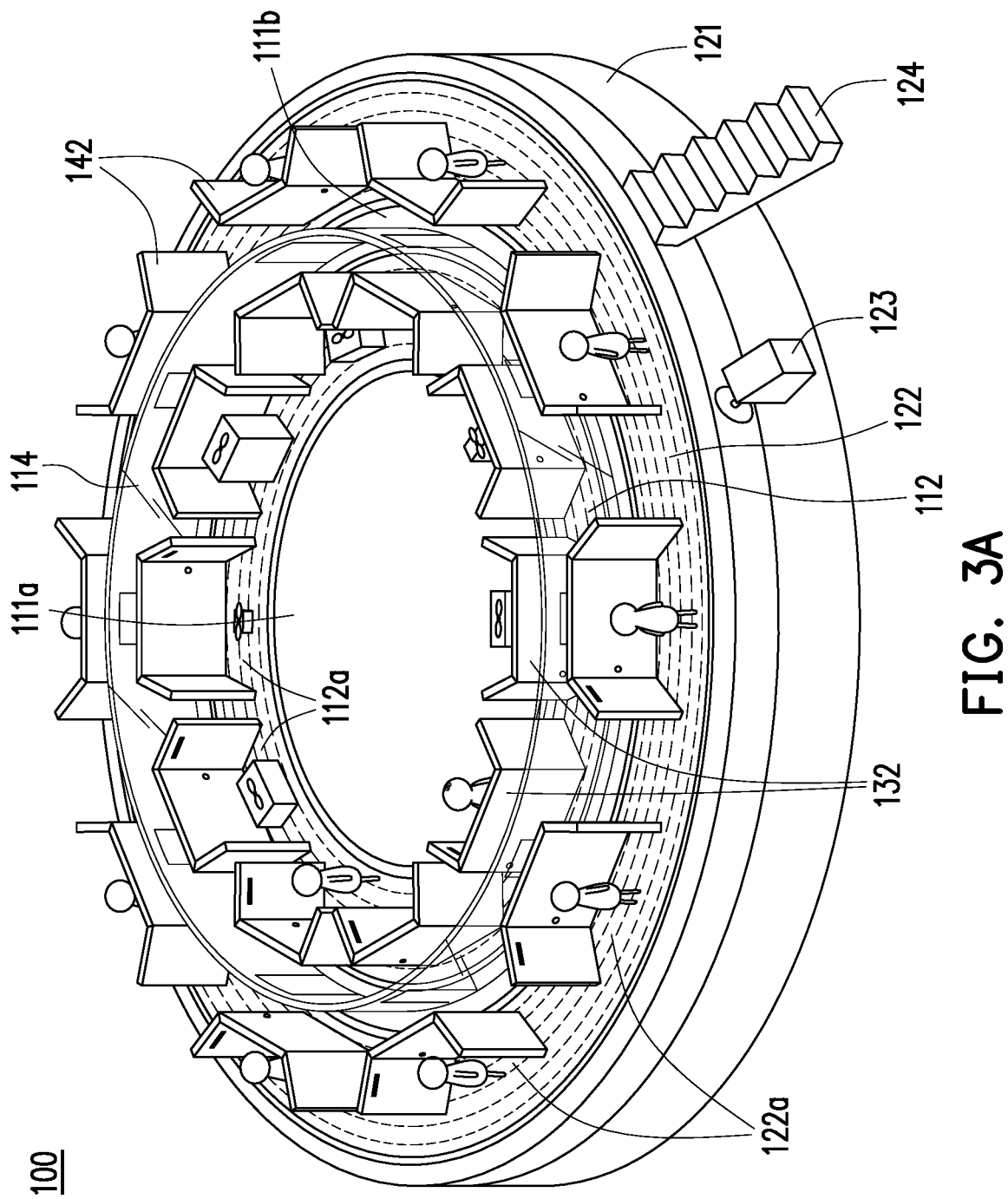
FIGS. 3A-3B are the other perspective views showing the interactive rotary machine during operation.
Figure 3B:
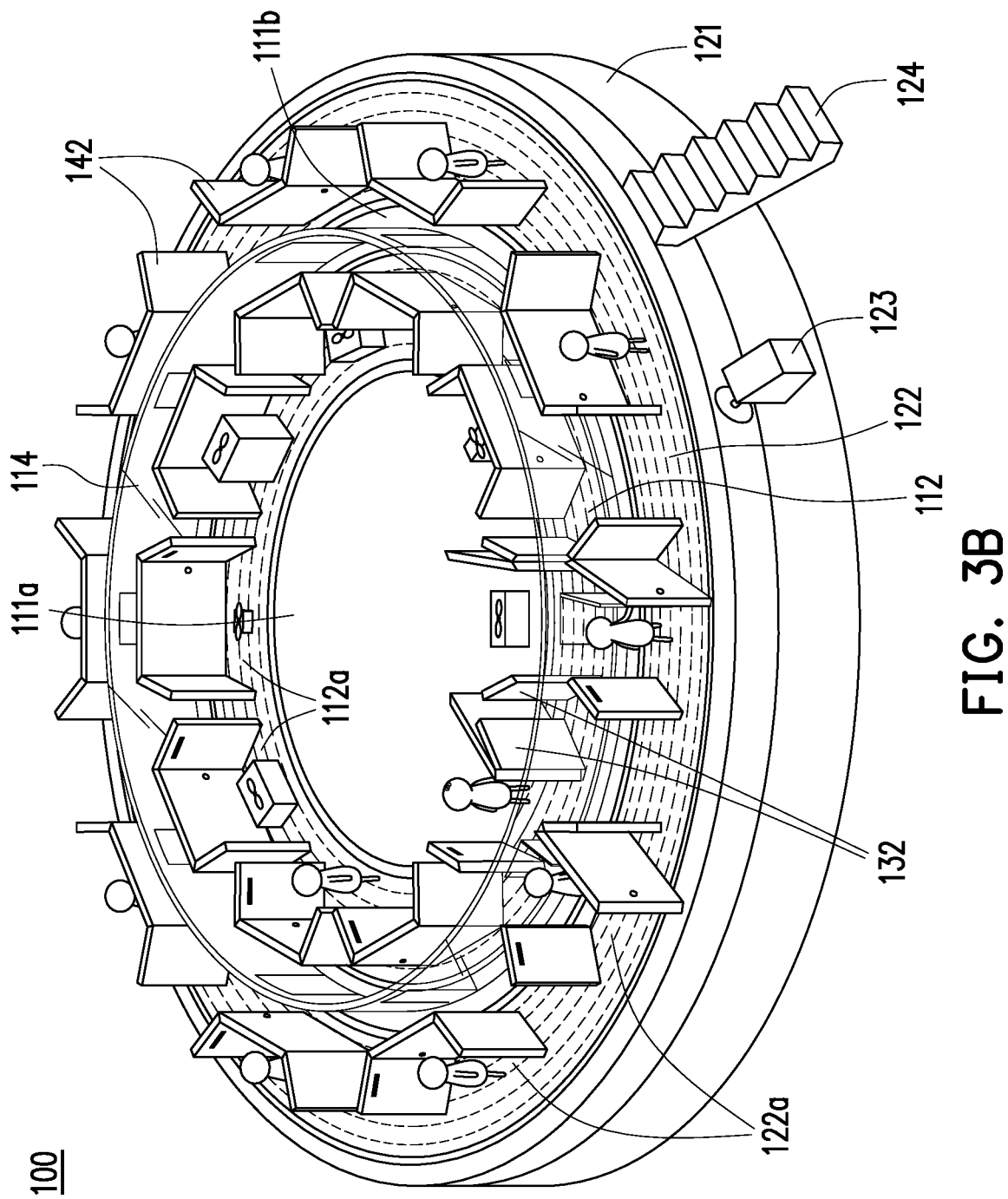

FIGS. 3A-3B are the other perspective views showing the interactive rotary machine 100 during operation.

As shown in FIG. 3A, each of the participants may stand at the second section 122a and gifts may be located at first sections 112a as an example. The present application is not limited thereto, the participants may stand at the first sections 112a and the gifts may be located at the second sections 122a. Or, the participants may stand at both first sections 112a and the second sections 112b depending on the game rule. The present application is not limited in the location of the participants and/or the gifts.

For example, as shown in FIG. 3B, some participants and the gifts, are stayed at the first sections 112a. The participants at the first sections 112a cannot see what happened at the second sections 122a. However, the participants at the second sections 122a can see what happened at the first sections 112a. As such, after unblock the blocker 142, the participants at the second sections 122a may choose whether to match with the surprise at the corresponding first section 112a.

It should be noted that although the first base 111, the first conveyor 112, the second base 121 and the second conveyor 122 are shown as circular/round shape, the present application is not limited thereto. The shape of the first base 111 and the second base 121 and the layout of the first conveyor 112 and the second conveyor 112 can be modified as long as the first sections 112a and the second sections 122a can be matched.

FIGS. 4A-4D are top views showing the interactive rotary machine 100 during operation.

Figure 4A:
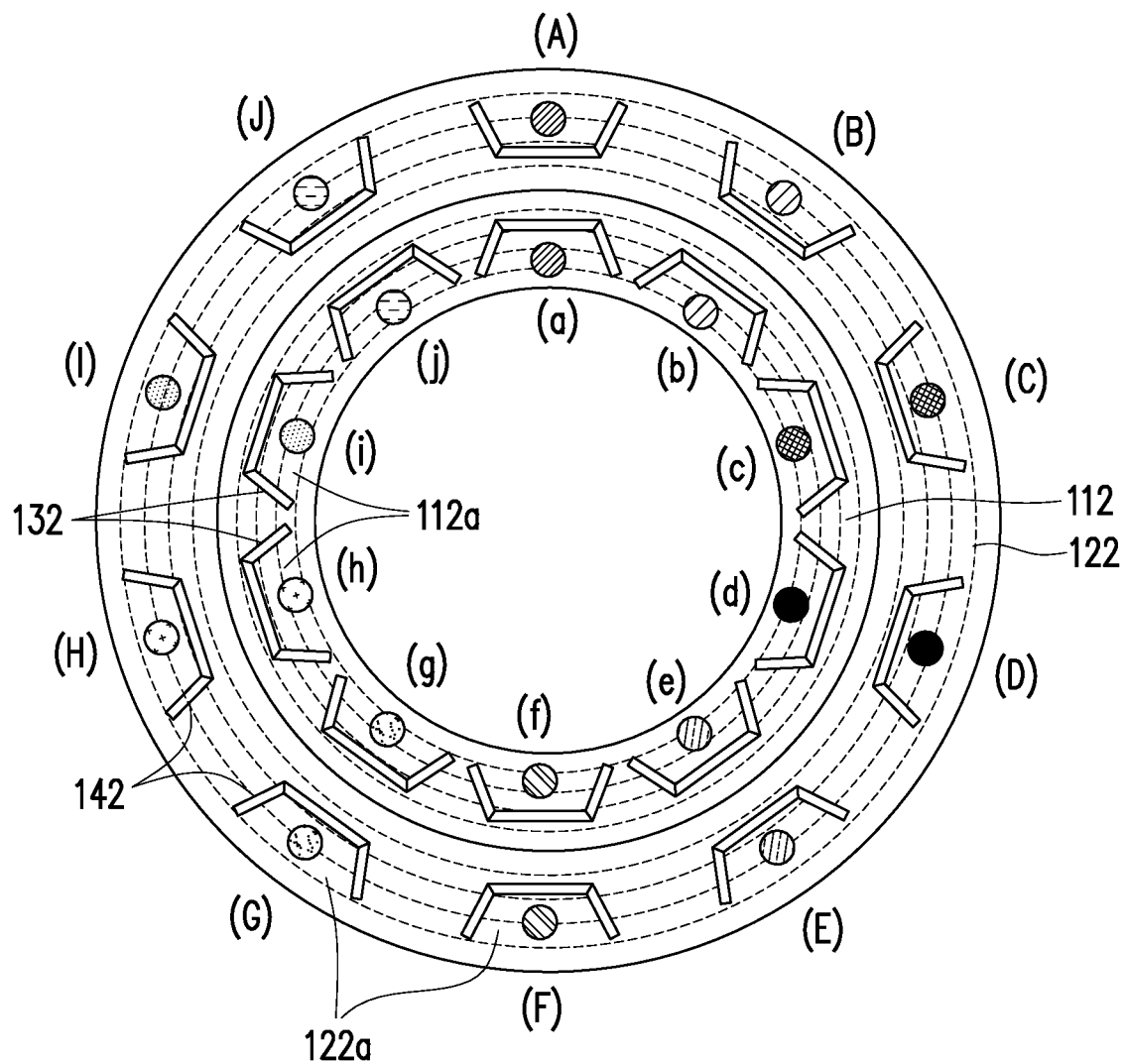
FIGS. 4A-4D are top views showing the interactive rotary machine during operation.

FIG. 4A shows the original state. As shown in FIG. 4 the matched participant/gift or participant/participant are shown as same pattern. For example, during the original state, (A) and (a) are matched; (B) and (b) are matched; (C) and (c) are matched etc. (A) can be participant or gift and (a) can be participant or gift too. The other labels such as (B), (b), (C), (c) etc. have the same concept in the present application.

Figure 4B:
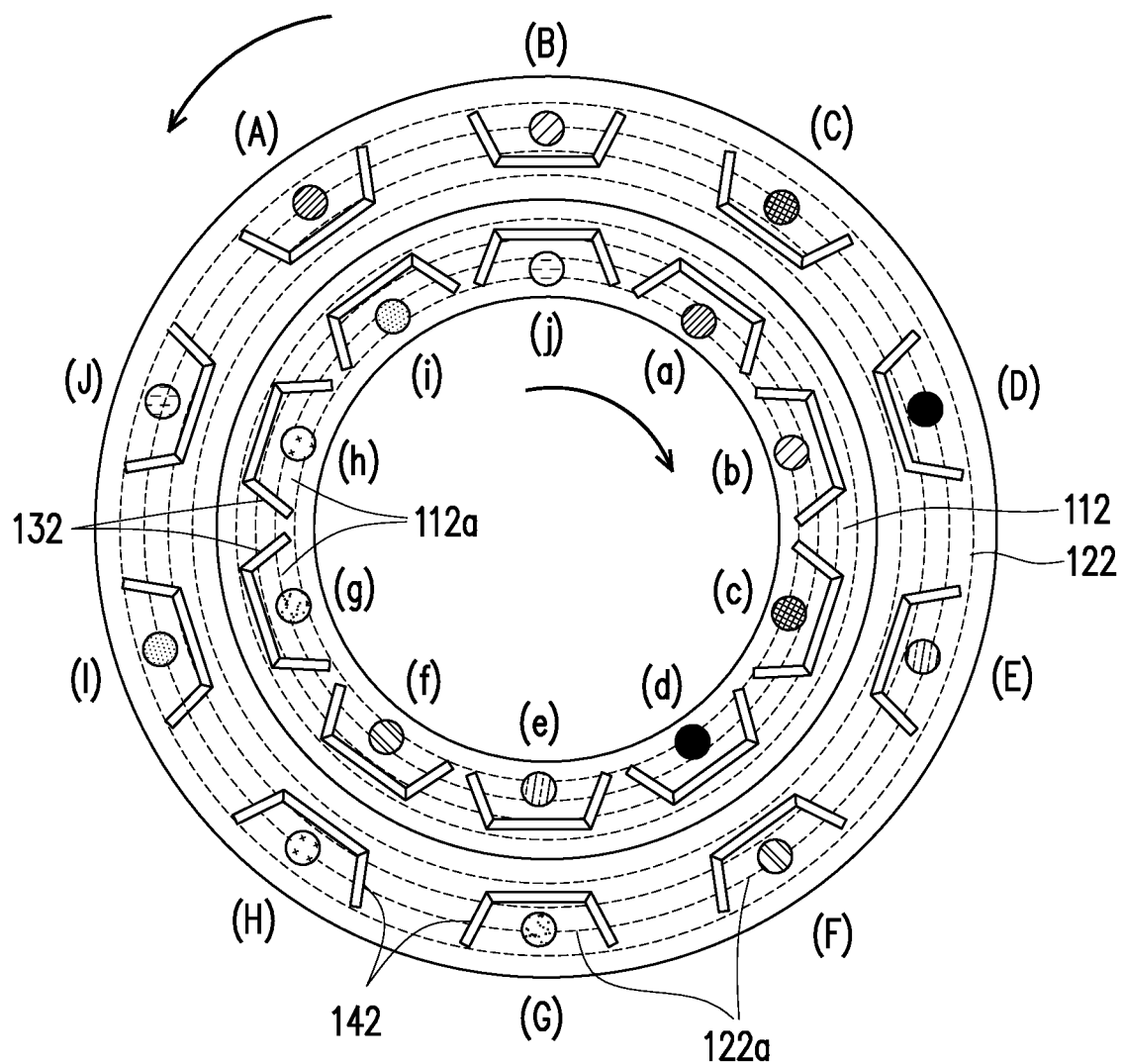

FIG. 4B shows a state when the first conveyor 112 and the second conveyor 122 are moved toward different direction. As shown in FIG. 4B, after the first movement, (A) is matched with (i) while (a) is matched with (C).

Figure 4C:
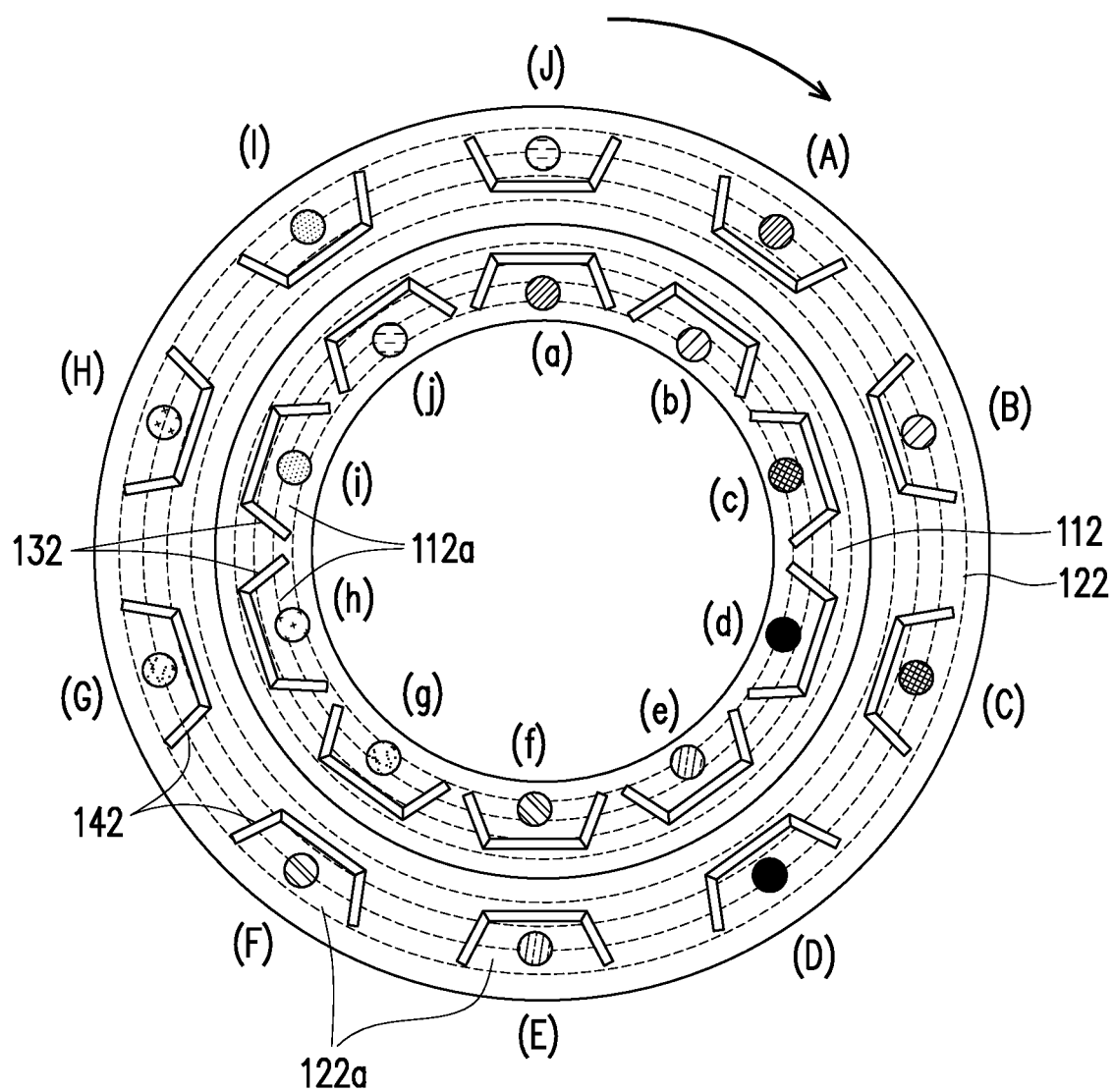

FIG. 4C shows a state when the first conveyor 112 is not moved while the second conveyor 122 is moved. As shown in FIG. 4C, after the first movement, (A) is matched with (b) while (a) is matched with (J).

Figure 4D:
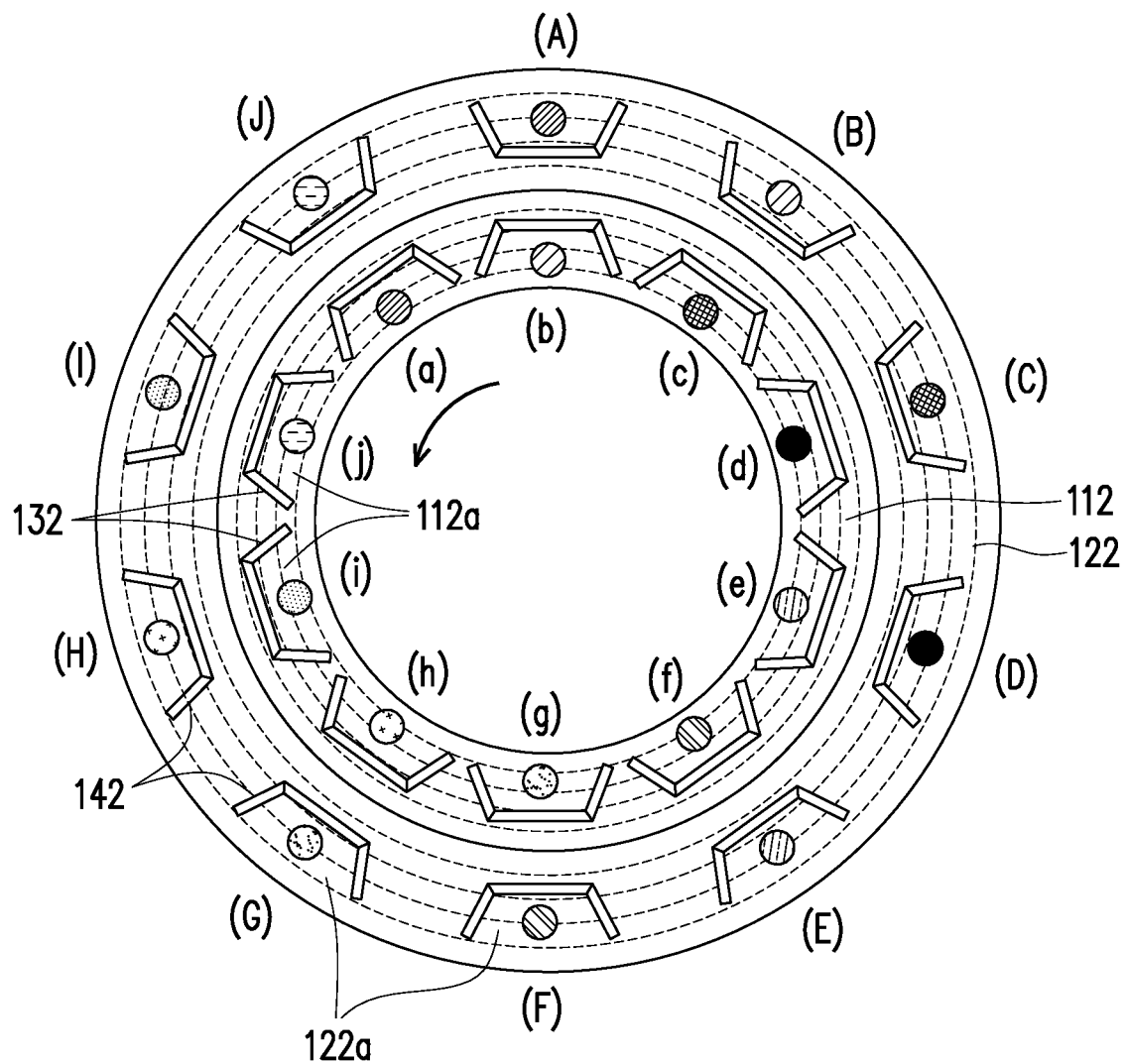

FIG. 4D shows a state when the first conveyor 112 is moved while the second conveyor 122 is not moved. As shown in FIG. 4D, after the first movement, (A) is matched with (b) while (a) is matched with (J).

In addition, the participants may also create different rules such as VIP sections, empty sections etc. for the interactive rotary machine 100, increasing the fun of the games. For example, (A), (B) and (C) may be VIP sections. As such, take FIG. 4A as an example, when VIP participants stands at (A), (B) or (C) section, the surprise at (a), (b) and (c) sections will be better.

Figure 5:
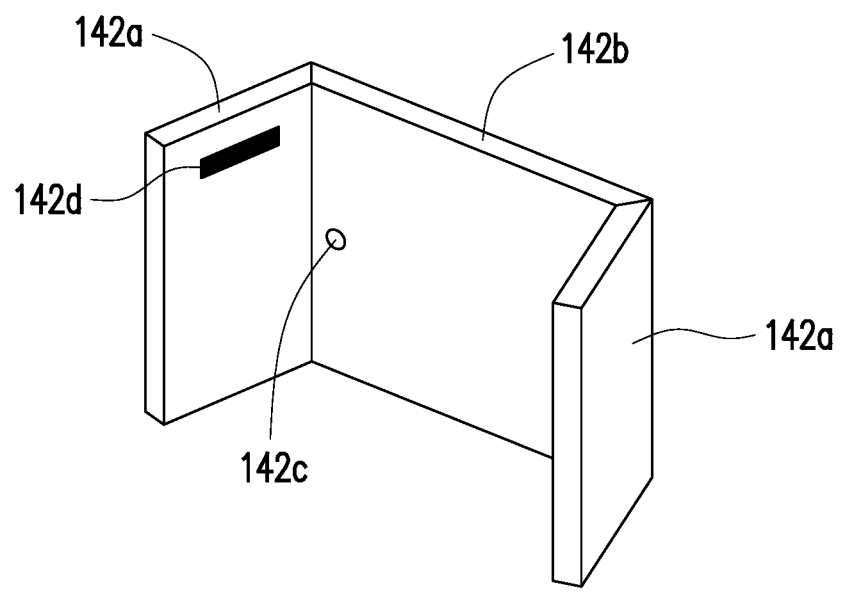
FIG. 5 shows a blocker of the interactive rotary machine.

FIG. 5 shows a blocker 142 of the interactive rotary machine 100.

FIG. 5 utilizes the blocker 142 as an example. However, the structure shown at FIG. 5 may also be applied to the blocker 132 (referring to FIG. 1A).

Referring to FIGS. 1A-2 and 5, the blocker 142 works as a door and comprises a fixed portion 142a, a blockable portion 142b, a handle 142c and a scanner 142d. The fixed portion 142a is coupled to the second conveyor 122 of the second conveyor assembly 120. The blockable portion 142b is rotatably coupled to the fixed portion 142a. The blockable portion 142b may be rotated manually, automatically or via other mechanical/electrical method. The handle 142c is coupled to the blockable portion 142b. By the above structure, the participants may see the surprise at the matched section. The scanner 142d is coupled to the fixed portion 142a, capable of scanning the participant when he/she enters the second section 122a. As such, when the participant enters the matched section, the scanner 142d may scan the code worn on the participants, recording the specific tuning and tune period, when matched. The code may be worn as a bracelet, identification card or necklace etc., the present application is not limited thereto. The scanner 142d may increase the efficiency and record every timing, and time period when operation. As such, the organizer may have better understanding about how to organize the game. For example, the organizer can charge the fee according to the time length etc.

Referring back to FIG. 3B as an example. By the above structure, the participant at the second section 122a may enter the first section 112a after seeing the surprise at the first section 112a. After unblock the door-like blacker 142, the participant may step over the outer base 111b of the first base 111 and achieve his/her surprise.

Figure 6A:
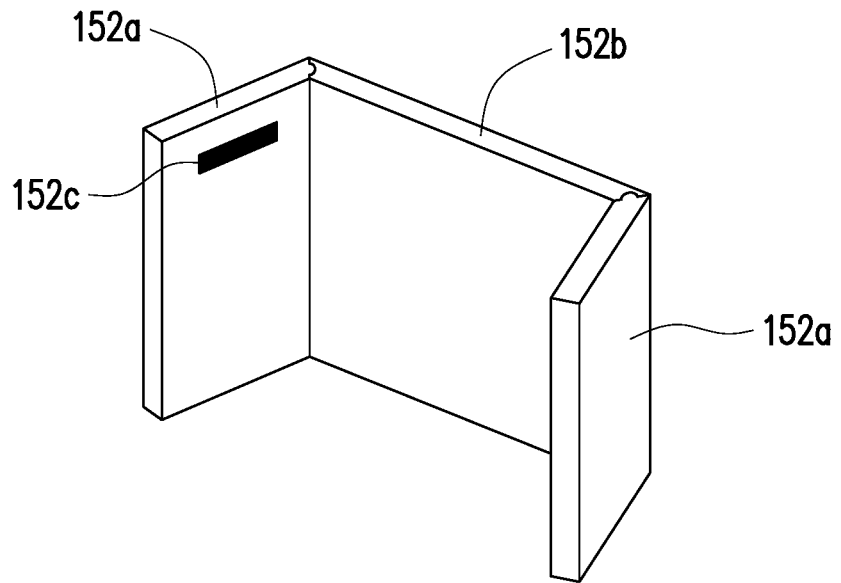
FIGS. 6A-6B show another blocker of the interactive rotary machine.
Figure 6B:
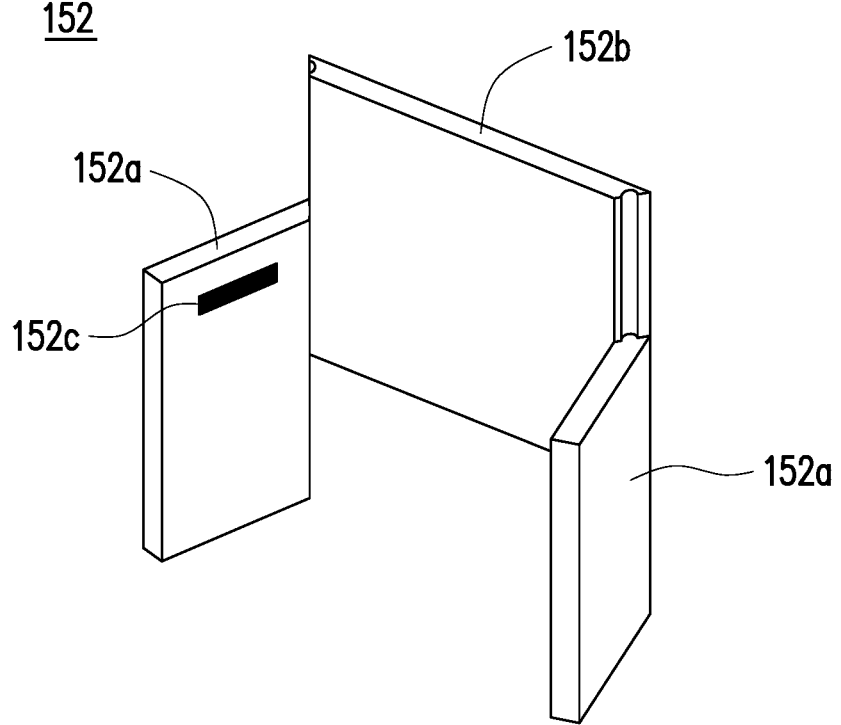

FIGS. 6A-6B show another blocker 152 of the interactive rotary machine 100. The difference between the blocker 142 and the blocker 152 (referring to FIG. 5) is the block mechanism. The blocker 152 comprises a fixed portion 152a, a blockable portion 152b and a scanner 152c. The blockable portion 152b is slidably coupled to the fixed portion 152a via tongue and groove structure. The blockable portion 152b can be slid along the fixed portion 152a by electrical and/or mechanical method such as claw or motor.

Figure 7:
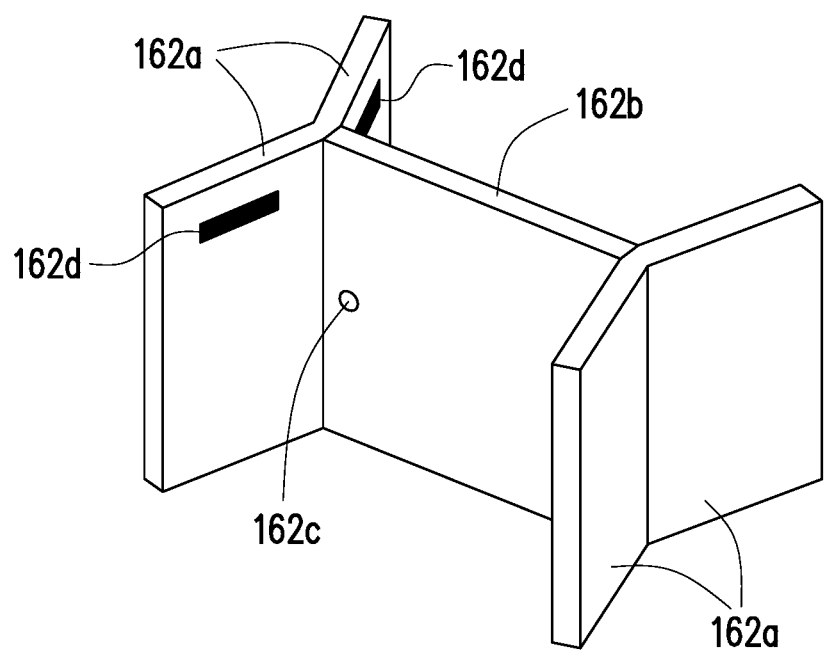
FIG. 7 shows the other blocker of the interactive rotary machine.

FIG. 7 shows the other blocker 162 of the interactive rotary machine 100.

As shown in FIG. 7, the blocker 162 is a combination of one first blacker 132 (referring to FIG. 1) and one second blocker 142 (referring to FIG. 1). The difference between the blocker 162 and the blocker 142 (referring to FIG. 5) is a fixed portion 162a. The blocker comprises the fixed portion 162a, a blockable portion 162b, a handle 162c and a scanner 162d. The fixed portion 162a combines the fixed portion 142a of the blocker 142 (referring to FIG. 5) and a fixed portion of the blacker 132 (referring to FIG. 1A).

Referring back to FIGS. 3A-3B, by the above structure, the participant at the second section 122a may enter the first section 112a when the first section 112a and the second section 122a are matched. After unblock the door-like blocker 162, the participants may not need to step over the outer base 111b of the first base 111. The surprise at the first section 112a can be achieved simply by blocking the blockable portion 162b.

When utilizing the blocker 162, the blocker 162 is blocked when the first conveyor 112 (referring to FIG. 1) and the second conveyor 122 (referring to FIG. 1) are moving. Similarly, the blocker 162 is unblocked when the first conveyor 112 (referring to FIG. 1) and the second conveyor 122 (referring to FIG. 1) are stopped. In addition, the first conveyor 112 and the second conveyor 122 are moved toward the same direction.

Figure 8A:
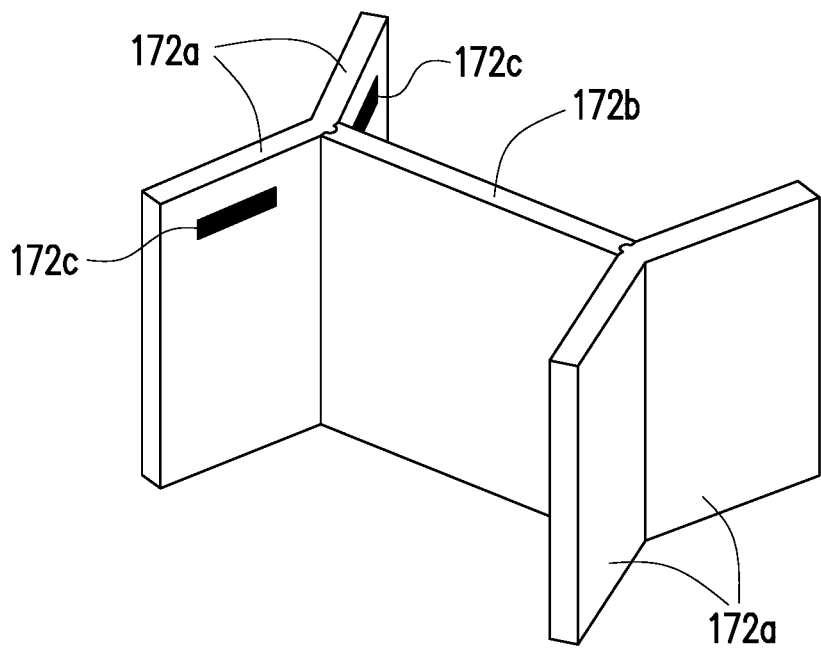
FIGS. 8A-8B show the other blocker of the interactive rotary machine.
Figure 8B:
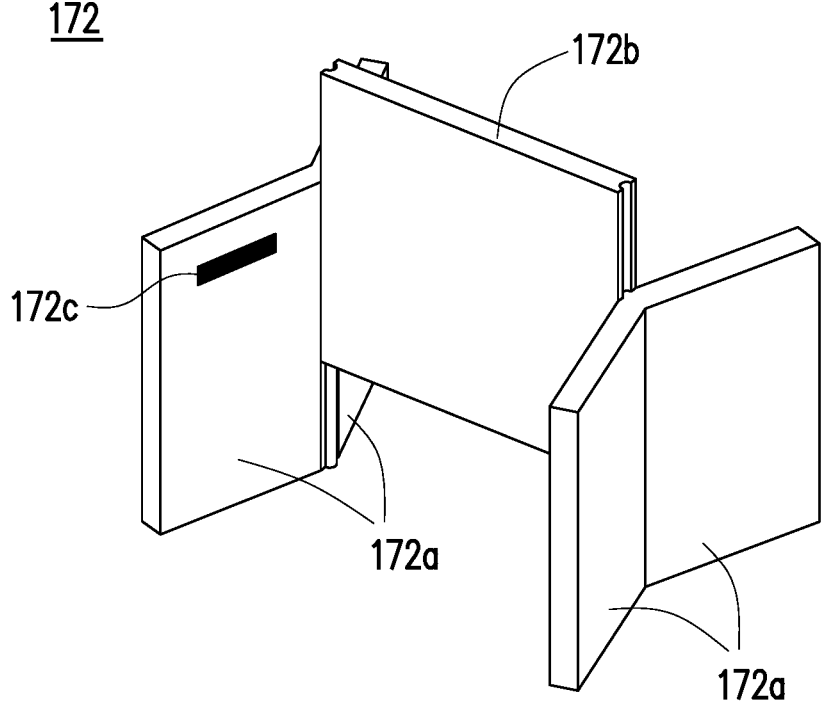

FIGS. 8A-8B show the other blocker 172 of the interactive rotary machine 100. The difference between the blocker 172 and the blocker 162 (referring to FIG. 7) is the block mechanism. The blocker 172 comprises a fixed portion 172a, a blockable portion 172b and a scanner 172c. The blockable portion 172b is slidably coupled to the fixed portion 172a via tongue and groove structure.

Figure 9:
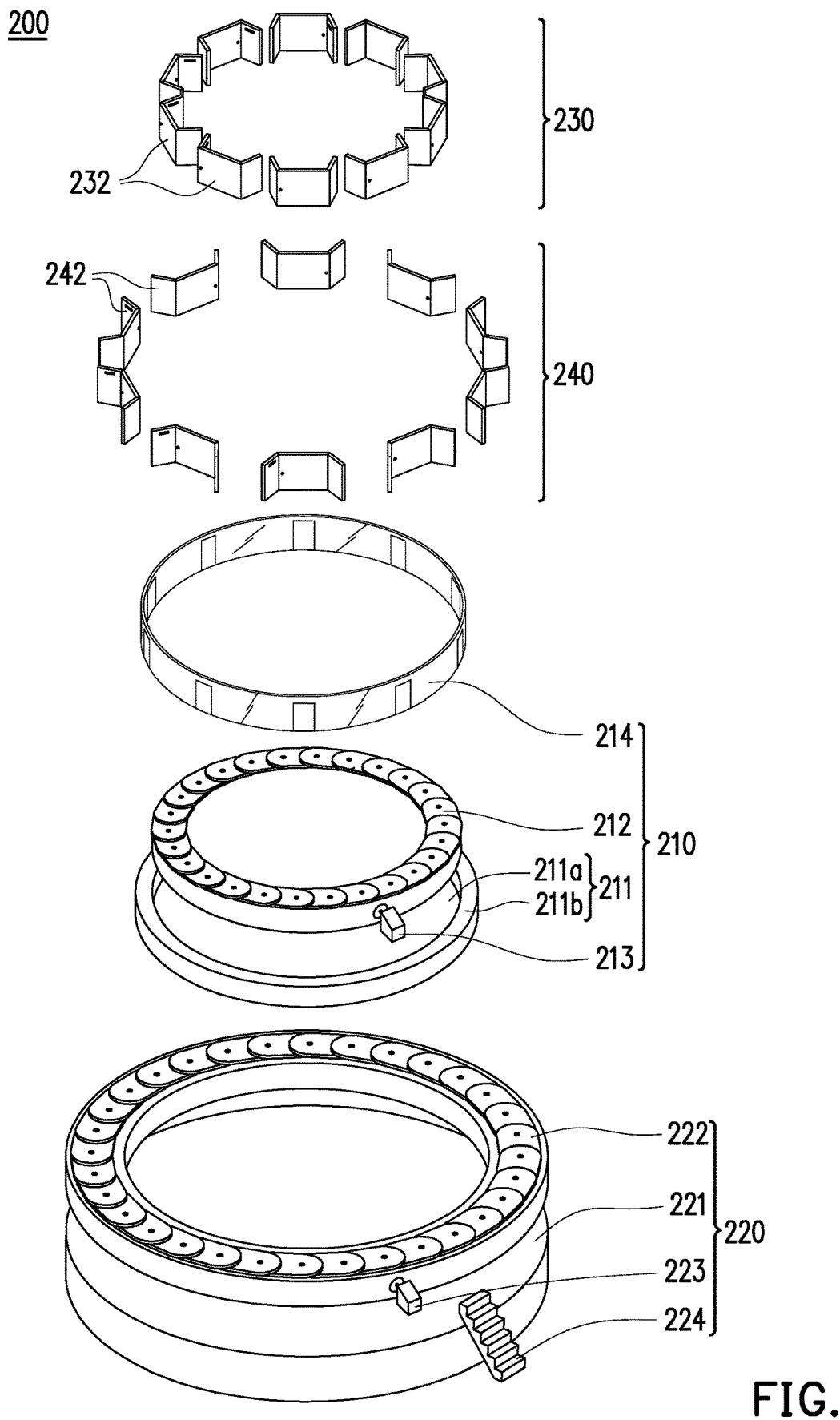
FIG. 9 is another interactive rotary machine of the present application.

FIG. 9 is another interactive rotary machine 200 of the present application.

The interactive rotary machine 200 comprises a first conveyor assembly 210, a second conveyor assembly 220, a first blocker assembly 230 and a second blocker assembly 240. The first conveyor assembly 210 comprises a first base 211 comprising an inner base 211a and an outer base 211b, a first conveyor 212, a first motor 213 and a mirror 214. The second conveyor assembly 220 comprises a second base 221, a second conveyor 222, a second motor 223 and a stair 224. The first blocker assembly 230 comprises a plurality of blockers 232, The second block assembly 240 comprises a plurality of blockers 242.

The differences between the interactive rotary machine 200 and the interactive rotary machine 100 (referring to FIG. 2) is the structure of the first conveyor 212 and the second conveyor 222. As describe before, the first conveyor 212 and the second conveyor 222 are not limited as long as the first conveyor 212 and the second conveyor 222 is operatable.

Figure 10:
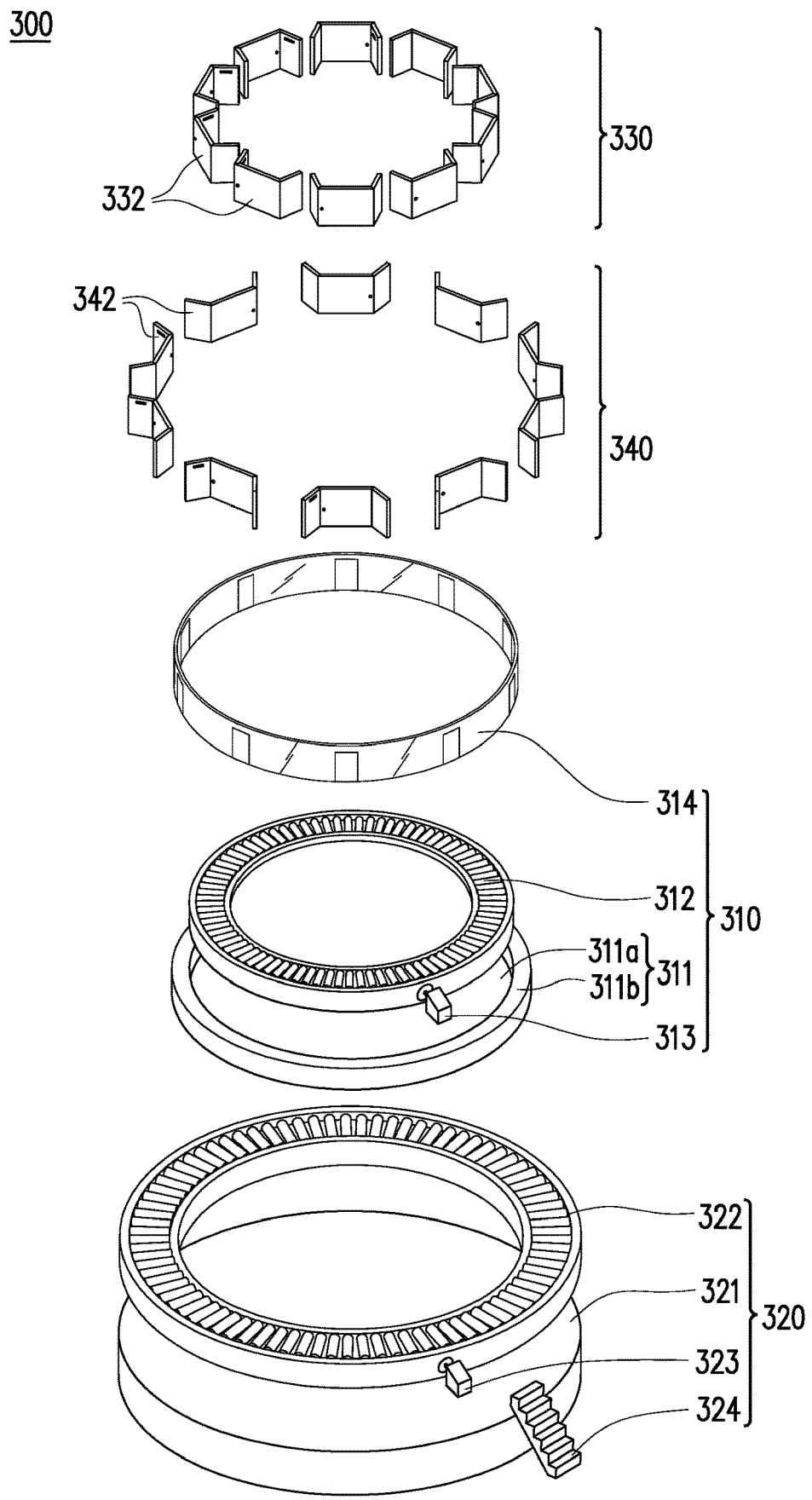
FIG. 10 is the other interactive rotary machine of the present application.

FIG. 10 is the other interactive rotary machine 300 of the present application.

The interactive rotary machine 300 comprises a first conveyor assembly 310, a second conveyor assembly 320, a first blocker assembly 330 and a second blocker assembly 340. The first conveyor assembly 310 comprises a first base 311 comprising an inner base 311a and an outer base 311b, a first conveyor 312, a first motor 313 and a mirror 314. The second conveyor assembly 320 comprises a second base 321, a second conveyor 322, a second motor 323 and a stair 324. The first blocker assembly 330 comprises a plurality of blockers 332. The second block assembly 340 comprises a plurality of blockers 342.

The differences between the interactive rotary machine 300 and the interactive rotary machine 100 (referring to FIG. 2) is the structure of the first conveyor 312 and the second conveyor 322. As describe before, the first conveyor 312 and the second conveyor 322 are not limited as long as the first conveyor 312 and the second conveyor 322 is operatable. The first conveyor 312 and the second conveyor 322 of the interactive rotary machine 300 are roller conveyors as an example.

Based on the above, the interactive rotary machine of the present application allows the participants to have more surprising game since the blocker assembly may cover the contour of the presents. In addition, since the conveyor may move toward different direction, the diversity of the game may be increased. Furthermore, the participants may also create different rules for the interactive rotary machine of the present application such as VIP section or no-gift section etc, providing more fun games to the participants.

Meanwhile, the mirror may provide more selection and prevent embarrassment if the participants unsatisfied with the surprise. The scanner may also increase the efficiency and record every timing and time period when operation, allowing the organizer to have better understanding about how to organize the game.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. An interactive rotary machine, comprising:
   a first conveyor assembly comprising a first base, a first conveyor coupled to the first base and a first motor coupled to the first conveyor;
   a first blocker assembly coupled to the first conveyor assembly, wherein the first blocker assembly forms a plurality of first sections at the first conveyor assembly, wherein the first blocker assembly comprises a plurality of first blockers, wherein each of the first blockers forming an independent first section, wherein each of the first blocker comprises a first fixed portion and a first blockable portion, the first fixed portion is coupled to the first conveyor assembly and the first blockable portion is coupled to the first fixed portion;
   a second conveyor assembly comprising a second base, a second conveyor coupled to the second base and a second motor coupled to the second conveyor; and
   a second blocker assembly coupled to the second conveyor assembly, wherein the second blocker assembly forms a plurality of second sections at the second conveyor assembly, wherein the second blocker assembly comprises a plurality of second blockers, wherein each of the second blockers forming an independent second section, wherein each of the second blocker comprises a second fixed portion and a second blockable portion, the second fixed portion is coupled to the second conveyor assembly and the second blockable portion is coupled to the fixed portion, wherein the first blocker assembly and the second blocker assembly are unblocked when the plurality of first sections and the plurality of second sections are matched, meaning the first blockable portions and the second blockable portions are faced with each other correspondingly.

2. The interactive rotary machine as claimed in claim 1, wherein the first conveyor is a belt conveyor.

3. The interactive rotary machine as claimed in claim 1, wherein the first conveyor is a roller conveyor.

4. The interactive rotary machine as claimed in claim 1, wherein the second conveyor is a belt conveyor.

5. The interactive rotary machine as claimed in claim 1, wherein the second conveyor is a roller conveyor.

6. The interactive rotary machine as claimed in claim 1, wherein the first blockable portion is slidably coupled to the first fixed portion.

7. The interactive rotary machine as claimed in claim 1, wherein the first blockable portion is rotatably coupled to the first fixed portion.

8. The interactive rotary machine as claimed in claim 7, wherein each of the first blocker further comprises a handle coupled to the first blockable portion.

9. The interactive rotary machine as claimed in claim 1, wherein the second blockable portion is slidably coupled to the second fixed portion.

10. The interactive rotary machine as claimed in claim 1, wherein the second blockable portion is rotatably coupled to the second fixed portion.

11. The interactive rotary machine as claimed in claim 10, wherein each of the second blocker further comprises a handle coupled to the second blockable portion.

* * * * *